United States Patent
Andrzejewski et al.

(10) Patent No.: US 9,261,658 B2
(45) Date of Patent: Feb. 16, 2016

(54) METHOD FOR FASTENING A FIBER OPTIC CONNECTOR TO A FIBER OPTIC CABLE

(75) Inventors: Tomasz Andrzejewski, Zgierz (PL); Bert Zamzow, Stockdorf (DE)

(73) Assignee: CCS TECHNOLOGY, INC., Wilmington, DE (US)

( * ) Notice: Subject to any disclaimer, the term of this patent is extended or adjusted under 35 U.S.C. 154(b) by 643 days.

(21) Appl. No.: 13/454,692

(22) Filed: Apr. 24, 2012

(65) Prior Publication Data

US 2012/0263421 A1 Oct. 18, 2012

Related U.S. Application Data

(63) Continuation of application No. PCT/US2010/052612, filed on Oct. 14, 2010.

(30) Foreign Application Priority Data

Oct. 27, 2009 (EP) .................................... 09013501

(51) Int. Cl.
*G02B 6/38* (2006.01)

(52) U.S. Cl.
CPC ............ *G02B 6/3887* (2013.01); *G02B 6/3889* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 4,795,229 A | 1/1989 | Abendschein et al. ...... | 350/96.2 |
| 5,073,043 A | 12/1991 | DiMarco et al. ................ | 385/81 |
| 5,224,187 A | 6/1993 | Davidson ........................ | 385/87 |
| 5,475,782 A | 12/1995 | Ziebol ............................. | 385/87 |
| 5,719,977 A | 2/1998 | Lampert et al. ................. | 385/60 |
| 6,389,214 B1 * | 5/2002 | Smith et al. .................... | 385/136 |
| 7,111,990 B2 * | 9/2006 | Melton et al. .................. | 385/53 |
| 7,955,004 B2 * | 6/2011 | DiMarco ........................ | 385/99 |
| 8,172,465 B2 * | 5/2012 | Kleeberger ..................... | 385/76 |
| 2004/0228589 A1 * | 11/2004 | Melton et al. ................. | 385/100 |
| 2006/0280413 A1 | 12/2006 | Paschal et al. ................ | 385/112 |
| 2007/0127875 A1 * | 6/2007 | Allen et al. ..................... | 385/95 |
| 2009/0148103 A1 | 6/2009 | Lu et al. .......................... | 385/62 |
| 2011/0200291 A1 * | 8/2011 | Logan et al. ................... | 385/103 |

OTHER PUBLICATIONS

FlexNAP™, Outside Plant System, Corning Product Datasheet, EVO-617-EN.

European Patent Office, European Search Report for European Application No. 09013501.3; Mailing Date Mar. 26, 2010—5 pages.

Patent Cooperation Treaty, International Search Report and Written Opinion, International Application No. PCT/US2010/052612; Mailing Date Dec. 2, 2010—14 pages.

(Continued)

*Primary Examiner* — Tina Wong

(57) ABSTRACT

A method for fastening a fiber optic connector to a fiber optic cable including providing a fiber optic cable having at least one optical fiber, loose yarn serving as strength members and an outer cable sheath surrounding the loose yarn and optical fiber; providing a fiber optic connector having at least two recesses into which strength members of a fiber optic cable can be inserted; removing a portion of the outer cable sheath at an end of the fiber optic cable, thereby exposing a portion of the loose yarn at the end of the fiber optic cable; splitting the exposed portion of the loose yarn into at least two bundles; forming at least two yarn pins from the bundles; and inserting each yarn pin into a respective recess of the fiber optic connector and fastening using an adhesive. Also disclosed is the cable assembly made by the method.

18 Claims, 10 Drawing Sheets

(56) References Cited

OTHER PUBLICATIONS

Chinese Search Report issued in corresponding Appln. No. 2010800490744, dated Aug. 9, 2013.

Australian Patent Examination Report No. 1 issued in corresponding Appln. No. 2010313617, dated Oct. 10, 2013.

* cited by examiner

METHOD FOR FASTENING A FIBER OPTIC CONNECTOR TO A FIBER OPTIC CABLE

PRIORITY APPLICATION

This application is a continuation of International Application No. PCT/US10/52612 filed Oct. 14, 2010, which claims the benefit of priority to European Application No. 09013501.3, filed Oct. 27, 2009, both applications being incorporated herein by reference.

BACKGROUND

The present application relates to a method for fastening a fiber optic connector to a fiber optic cable. Further, the present application relates to an assembly comprising a fiber optic connector fastened to a fiber optic cable.

Fiber optic cables like outdoor fiber optic drop cables comprise at least one optical fiber being positioned within at least one protection tube, strength members and an outer cable sheath surrounding said strength members and the or each optical fiber being positioned within the or each protection tube. The or each protection tube surrounding the or each optical fiber can be filled with gel. The strength members can be provided by rigid strength members such as glass-reinforced plastic (GRP) rods and/or by loose yarn being non-rigid.

In order to provide a connectivity function for such a fiber optic cable, a fiber optic connector has to be fastened to the fiber optic cable. When fastening a fiber optic connector to a fiber optic cable, the strength members of the fiber optic cable are fastened to an inner part of the fiber optic connector.

In case the strength members of the fiber optic cable are provided by rigid strength members like GRP rods, said rigid strength members are usually inserted into and fixed to recesses of the respective inner part of the fiber optic connector. Such a fastening solution can be used only in case the fiber optic cable comprises rigid strength members.

In case the strength members of the fiber optic cable are provided by loose yarn like loose glass yarn or loose aramid yarn, the loose yarn is crimped to the respective inner part of fiber optic connector.

However, such a crimped solution for fastening a fiber optic connector to a fiber optic cable may not provide the proper tensile strength as well as the flexing and twist performance required especially in outdoor applications.

SUMMARY

Against this background, a novel method for fastening a fiber optic connector, especially a fiber optic outdoor connector, to a fiber optic cable, especially to a fiber optic outdoor cable, and a novel assembly comprising a fiber optic connector fastened to a fiber optic cable is provided.

The method of making the assembly comprises at least the following steps: a) providing a fiber optic cable comprising at least one optical fiber, loose yarn serving as strength members and an outer cable sheath surrounding said loose yarn and the or each optical fiber; b) providing a fiber optic connector comprising an inner part having at least two recesses into which strength members of a fiber optic cable can be inserted; c) removing a portion of said outer cable sheath of said fiber optic cable at an end of the fiber optic cable to which the fiber optic connector is to be fastened, thereby exposing a portion of said loose yarn of the fiber optic cable at said end of the fiber optic cable; d) splitting the exposed portion of said loose yarn into at least two bundles; e) forming at least two yarn pins from said bundles; and f) inserting each yarn pin into a respective recess of said inner part of said fiber optic connector and fastening said yarn pins to said inner part by using an adhesive.

The method for fastening a fiber optic connector to a fiber optic cable provides a better tensile strength as well as better flexing and twist performance of the assembly provided by the fiber optic cable and the fiber optic connector fastened to the fiber optic cable as required especially in outdoor applications. Additionally, cable assembly made by the method is also disclosed which may be a single fiber or multi-fiber cable assembly.

Preferred embodiments of the method for fastening a fiber optic connector to a fiber optic cable and of the assembly comprising a fiber optic connector fastened to a fiber optic cable are discussed in the description below. It is to be understood that the foregoing general description and the following detailed description present embodiments, and are intended to provide an overview or framework for understanding the nature and character of the disclosure. The accompanying drawings are intended to provide a further understanding, and are incorporated into and constitute a part of this specification. The drawings illustrate various embodiments, and together with the description serve to explain the principals and operation of the concepts disclosed.

BRIEF DESCRIPTION OF THE FIGURES

Exemplary embodiments will be explained in more detail with reference to the drawing, in which.

DETAILED DESCRIPTION

Figure 2:
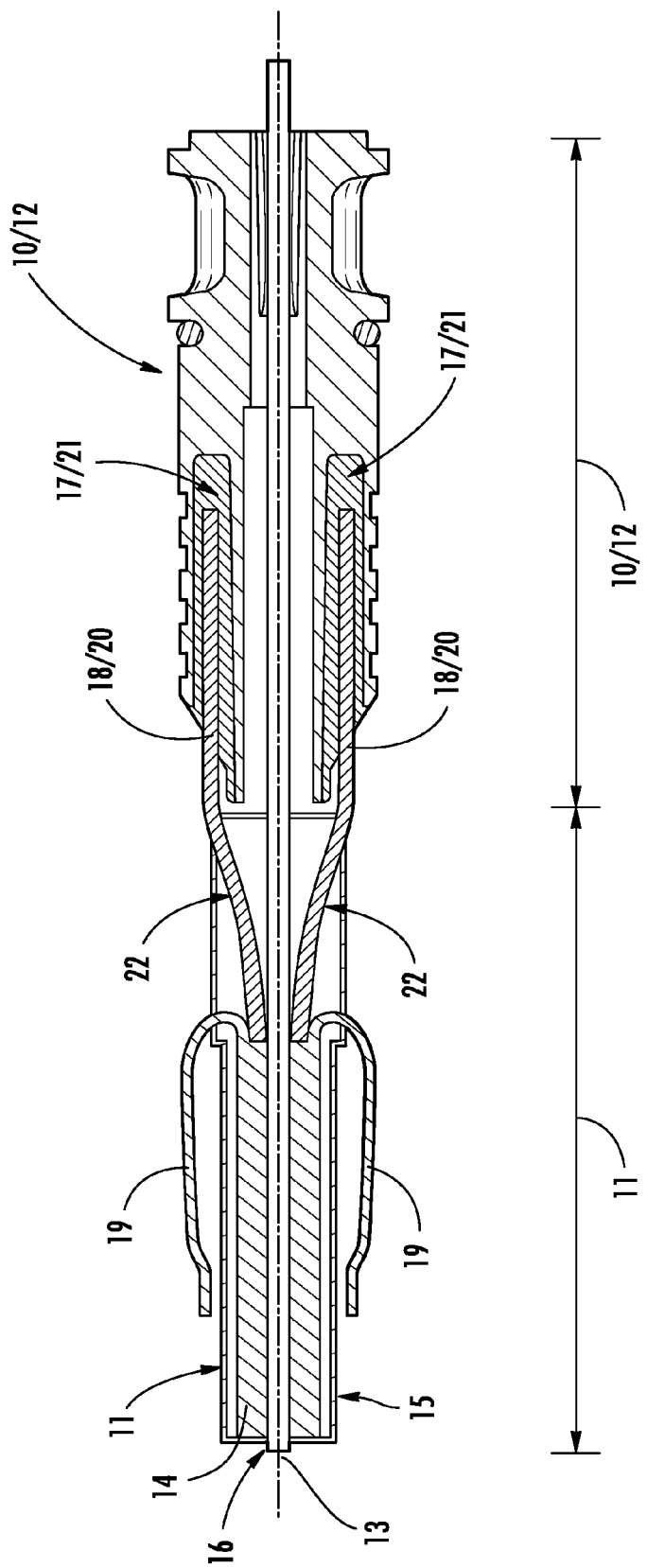
FIG. 2 shows an explanatory schematic cross section of an assembly provided by an inner part of a fiber optic connector and a fiber optic cable to which said inner connector part is fastened using the method of the present application

Reference will now be made in detail to certain embodiments, examples of which are illustrated in the accompanying drawings. The application relates to a method for fastening a fiber optic connector 10, especially a fiber optic outdoor connector, to a fiber optic cable 11, especially to a fiber optic outdoor cable 11. Further, the application relates to an assembly provided by said method. FIG. 2 shows an assembly comprising an inner part 12 of a fiber optic outdoor connector 10 being fastened to the shown fiber optic outdoor cable 11 making use of the novel method.

The novel method for fastening a fiber optic outdoor connector 10 to a fiber optic outdoor cable 11 comprises several steps.

Figure 1A:
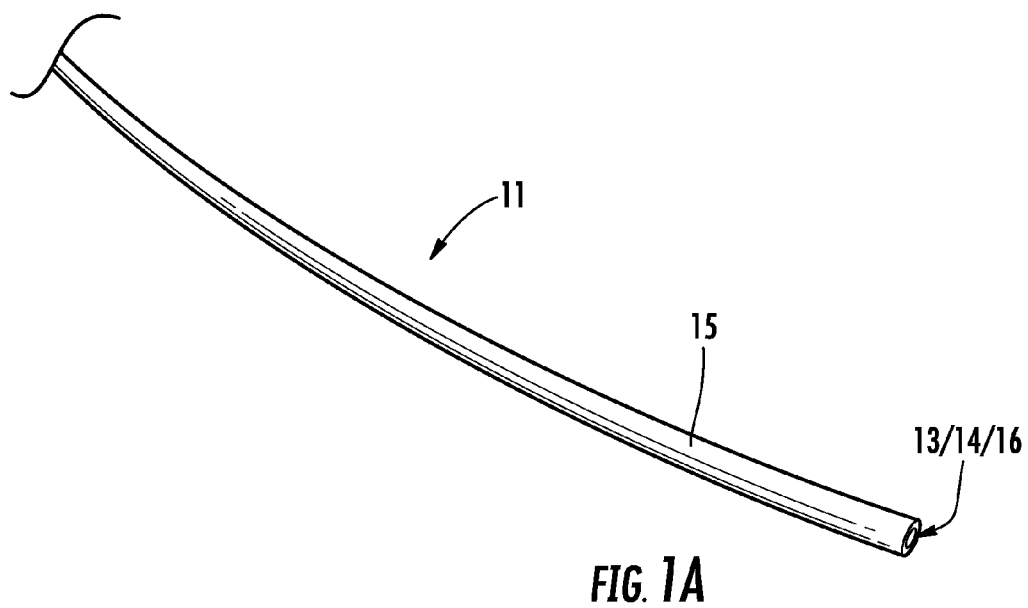
FIGS. 1a to 1d, 1f to 1n, and 1p to 1t illustrate several explanatory steps of the method for fastening a fiber optic connector to a fiber optic cable.

In a first step (see FIG. 1a) of the novel method, the fiber optic outdoor cable 11 comprising at least one optical fiber 13, loose yarn 14 serving as strength members and an outer cable sheath 15 surrounding said loose yarn 14 and the or each optical fiber 13 is provided.

The loose yarn 14 is preferably loose glass yarn or loose aramid yarn such as Kelvar® or other suitable loose yarn. The loose yarn 14 is as such non-rigid. In other words, the loose yarn 14 is easy bendable and does not have anti-buckling strength compared with rigid strength members like GRP rods.

The provided fiber optic outdoor cable 11 (see e.g. FIGS. 1a, 1f and 2) further comprises a protective tube 16 surrounding the or each optical fiber 13. The protective tube 16 may be gel filled or could exclude gel.

Figure 1B:
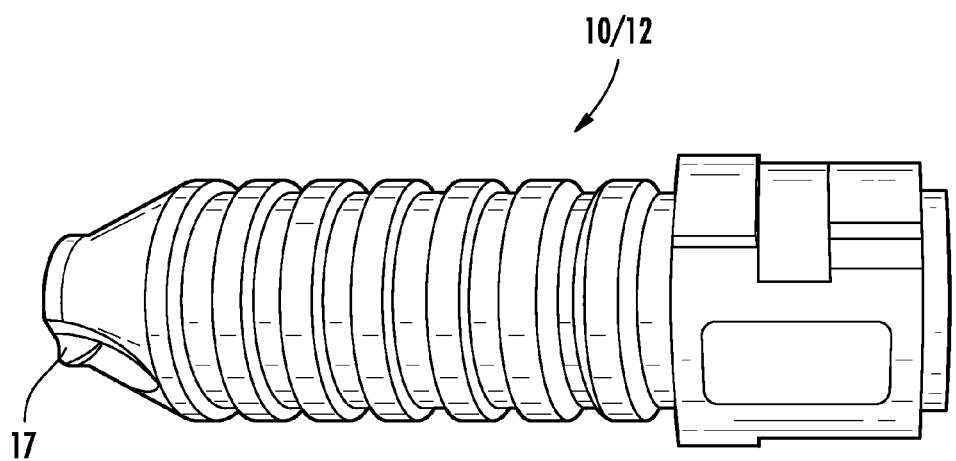

In a second step (see FIG. 1*b*) of the novel method, the fiber optic outdoor connector 10 is provided. Said fiber optic outdoor connector 10 comprises the inner part 12 having at least two recesses 17 (see FIG. 2). Into the recesses 17 strength members of a fiber optic cable can be inserted.

In a third step (see FIGS. 1*c*, 1*d*) of the novel method, a portion of said outer cable sheath 15 of said fiber optic outdoor cable 11 is removed, namely at an end of the fiber optic outdoor cable 11 to which the fiber optic outdoor connector 10 is to be fastened, thereby exposing a portion of said loose yarn 14 of the fiber optic outdoor cable 10 at said end of the fiber optic outdoor cable 11.

Figure 1C:
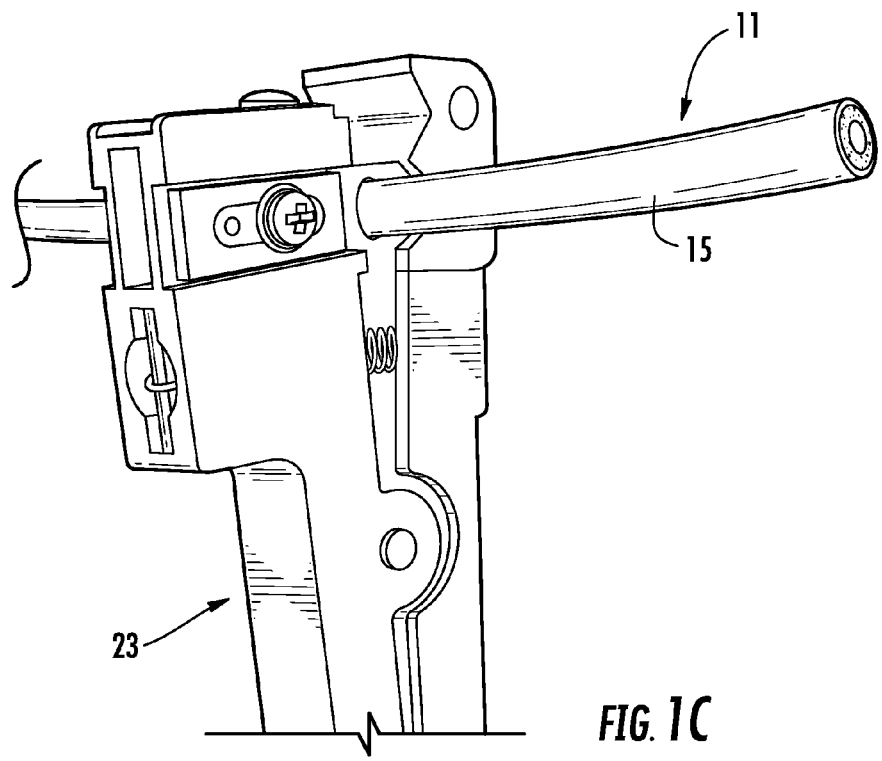
Figure 1D:
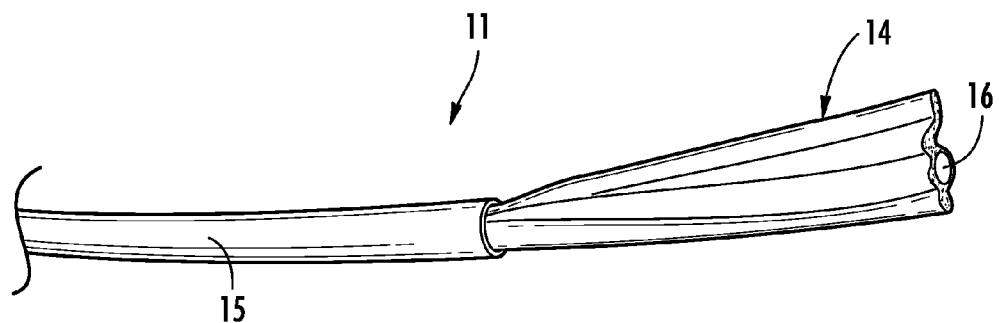

According to FIG. 1*c*, a cutting and stripping tool 23 is used to remove said portion of said outer cable sheath 15 in order to expose a portion of said loose yarn 14.

Figure 1F:
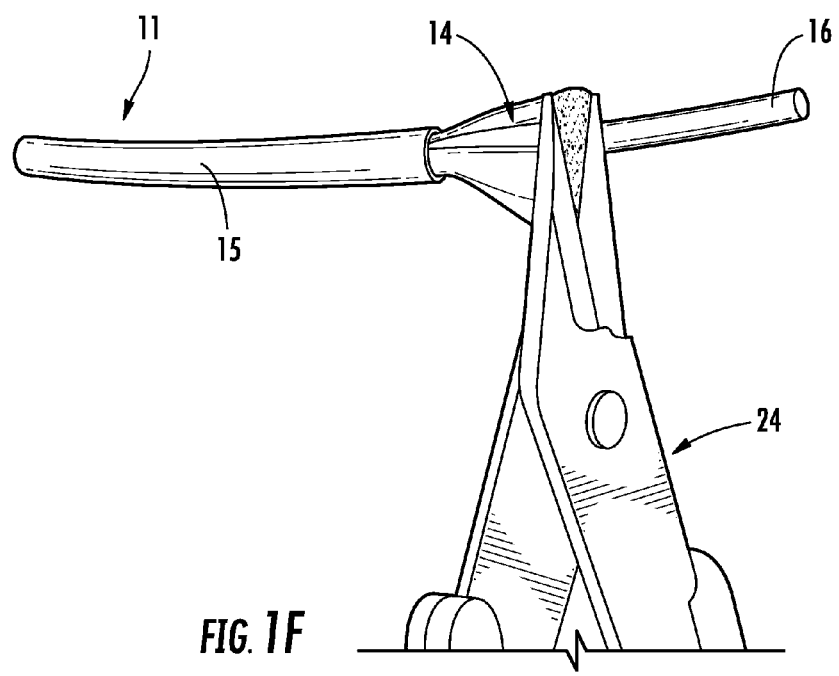

According to FIG. 1*f*, the loose yarn 14 being exposed by removing said portion of said outer cable sheath 15 can optionally be cut with a knife 24 in order to shorten the loose yarn 14 thereby providing a suitable length of the loose yarn 14 for the following steps of the novel method.

Figure 1G:
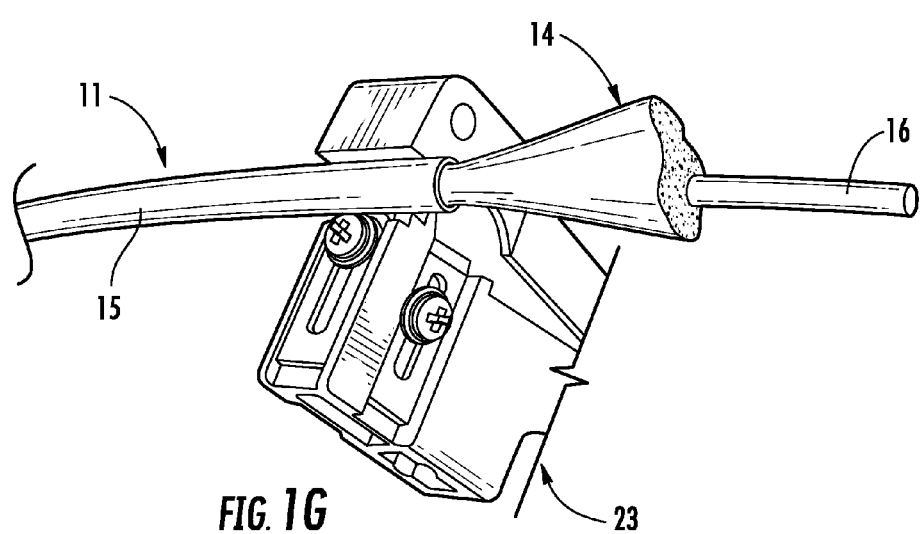

In order to give better access to the loose yarn 14 of the fiber optic cable 11, the outer cable sheath 15 of fiber optic outdoor cable 11 can optionally in addition be cut through in the length direction (see FIG. 1*g*) at two opposite sides of the fiber optic outdoor cable 11. The cutting and stripping tool 23 is used to cut the outer cable sheath 15 in the length direction.

In a fourth step (see FIGS. 1*h*, 1*i*) of the novel method, the exposed portion of said loose yarn 14 is split into at least two bundles of loose yarn.

Figure 1H:
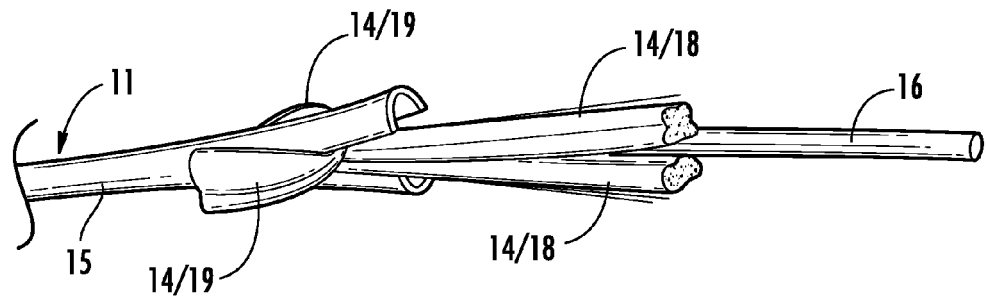
Figure 1I:
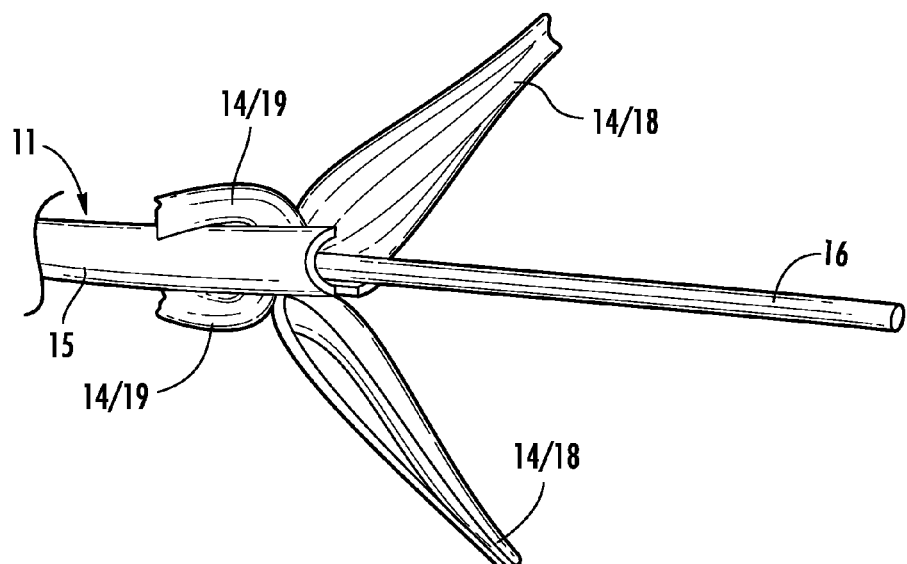

According to FIGS. 1*h* and 1*i*, the loose yarn 14 is split into four bundles, namely into two first bundles 18 and into two second bundles 19. The two first bundles 18 as well as the two second bundles 19 are each separated from each other at opposite sides of the fiber optic outdoor cable 11, namely of the protective tube 16. It is possible to have only one second bundle 19 or more than two second bundles 19.

Figure 1J:
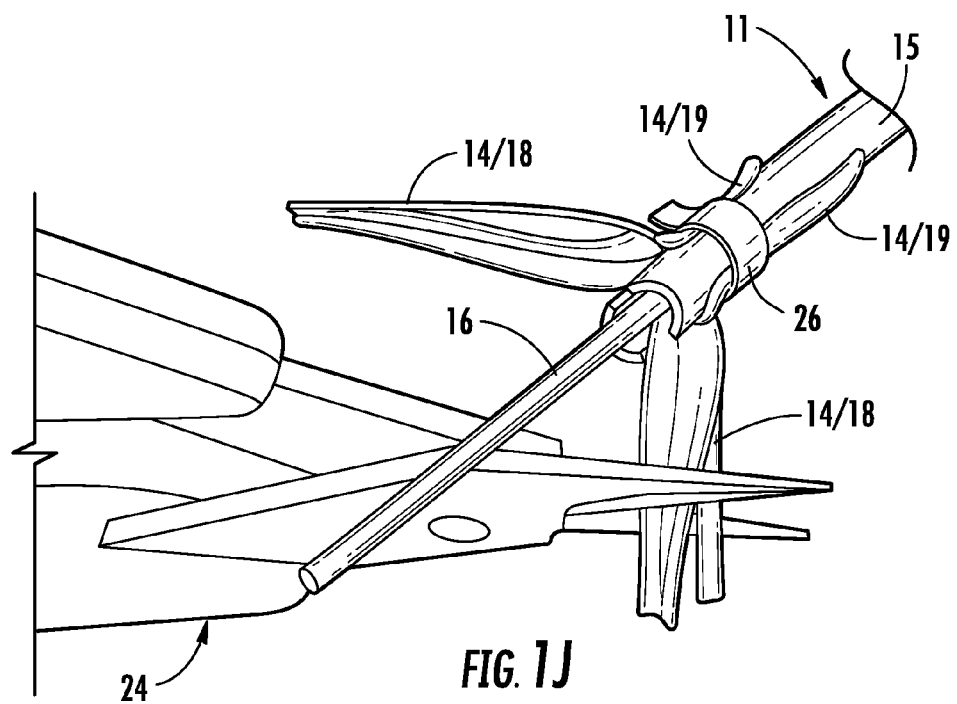

According to FIG. 1*j*, the loose yarn 14 of the first bundles 18 can optionally be cut with the knife 24 in order to shorten the loose yarn 14 of said first bundles 18 thereby providing a suitable length of the loose yarn 14 of said first bundles 18 for the following steps of the novel method.

Figure 1K:
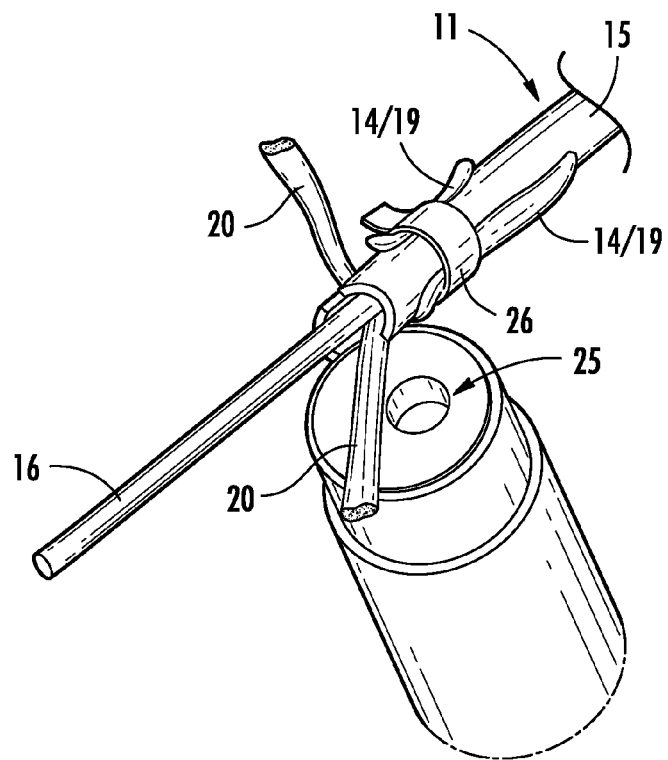
Figure 1L:
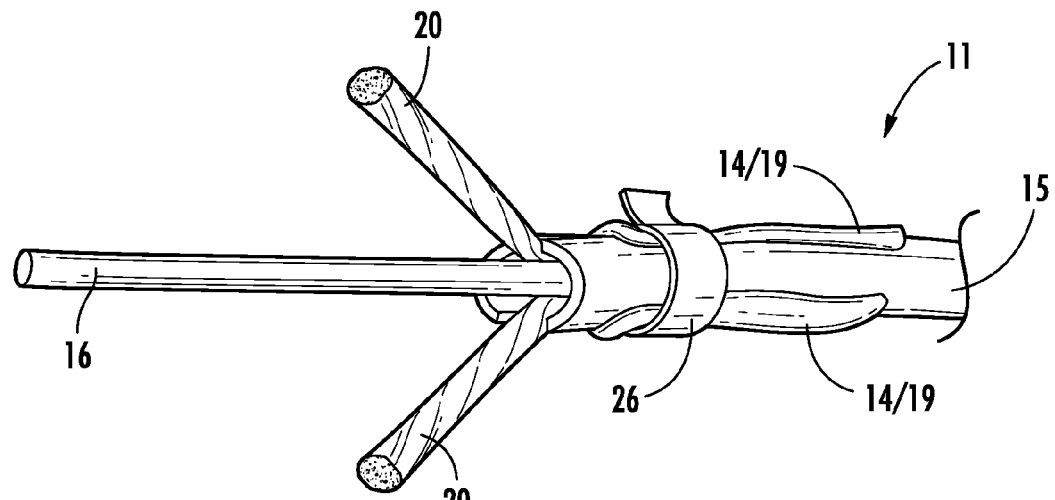
Figure 1M:
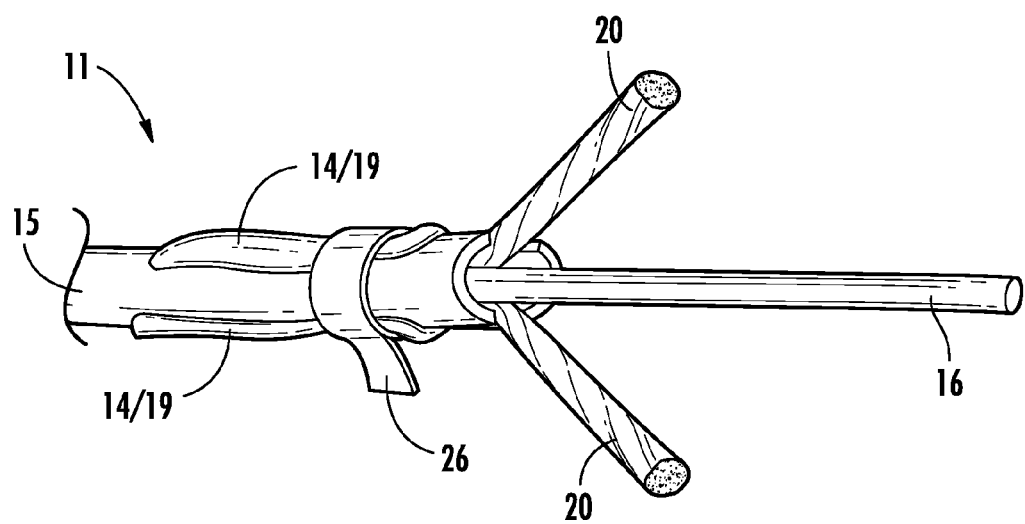

In a fifth step (see FIGS. 1*k*, 1*l*, 1*m*) of the novel method, at least two yarn pins 20 are formed from said bundles. According to FIGS. 1*k*, 1*l* and 1*m*, two yarn pins 20 are formed from the two first bundles 18. Said yarn pins 20 are formed from said first bundles 18 of loose yarn by gluing the loose yarn 14 of the respective bundle 18 together. Preferably, the loose yarn 14 of the respective bundle 18 is twisted before gluing the same. The loose yarn 14 of the respective bundle 18 is glued by coating said loose yarn 14 of the respective bundle 18 with an adhesive 25, e.g. with a paper glue, over the whole exposed length of the loose yarn bundle 18.

In order to avoid any interference between the loose yarn 14 of the first bundles 18 and the loose yarn 14 of the second bundles 19 while forming the yarn pins 20 from the first loose yarn bundles 18, the second loose yarn bundles 19 are preferably preliminary attached to the outer cable sheath 15 of the fiber optic cable 11 by e.g. an adhesive tape 26 (see FIGS. 1*j*, 1*k*, 1*l*, 1*m*).

Figure 1N:
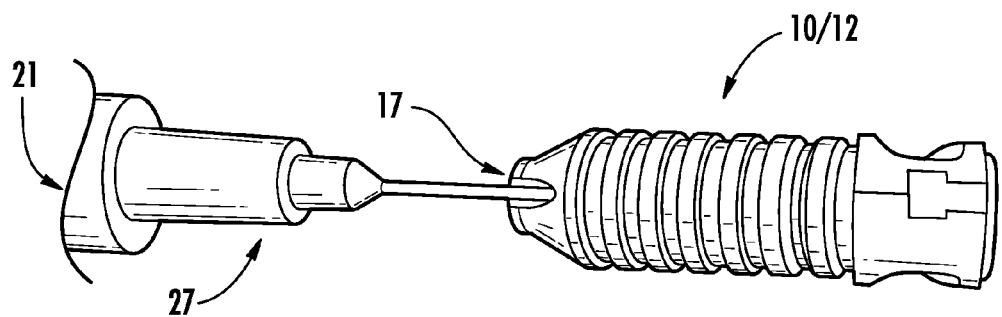
Figure 1P:
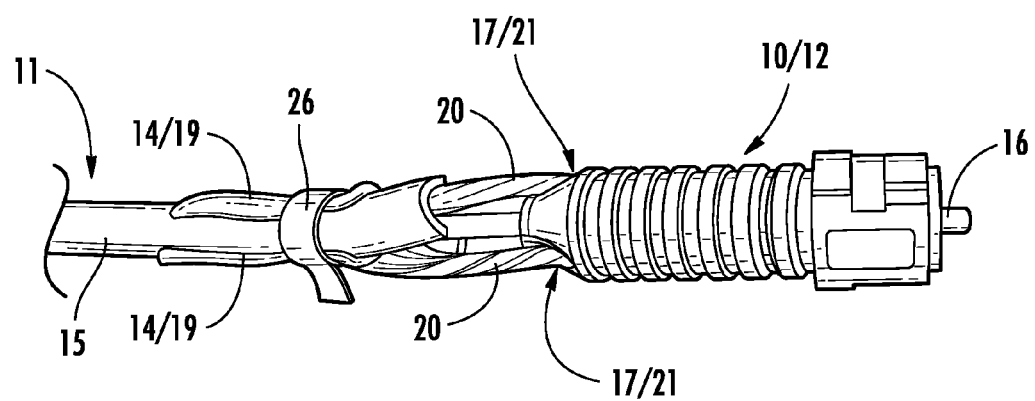
Figure 1Q:
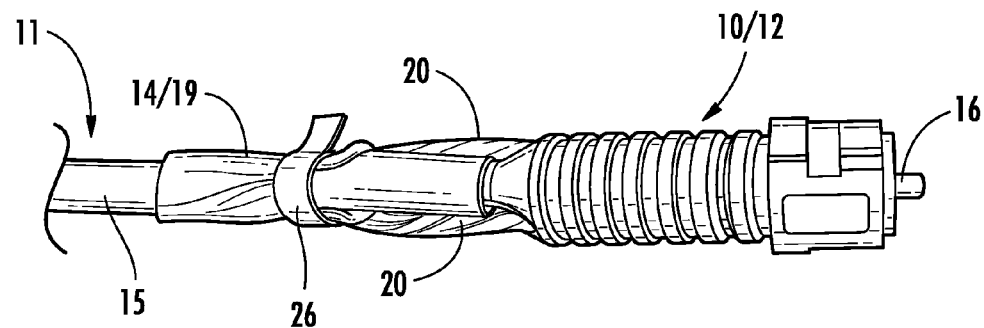

In a sixth step (see FIGS. 1*p*, 1*q*) of the novel method, each yarn pin 20 being formed from the first loose yarn bundles 18 is inserted into a respective recess 17 of said inner part 12 of said fiber optic outdoor connector 10 and fastened to said inner part 12 by using an adhesive, preferably a resin 21.

The recesses 17 of said inner part 12 of said fiber optic outdoor connector 10 which receive said yarn pins 20 provided in the fifth step of the novel method are filled (see FIG. 1*n*) with said adhesive, preferably with said resin 21, and then the yarn pins 20 are partly inserted into said recesses 17 being filled with said adhesive, preferably with said resin 21. According to FIG. 1*n* a pipette 27 is used to fill the recesses 17 with said adhesive, preferably with said resin 21.

Figure 1R:
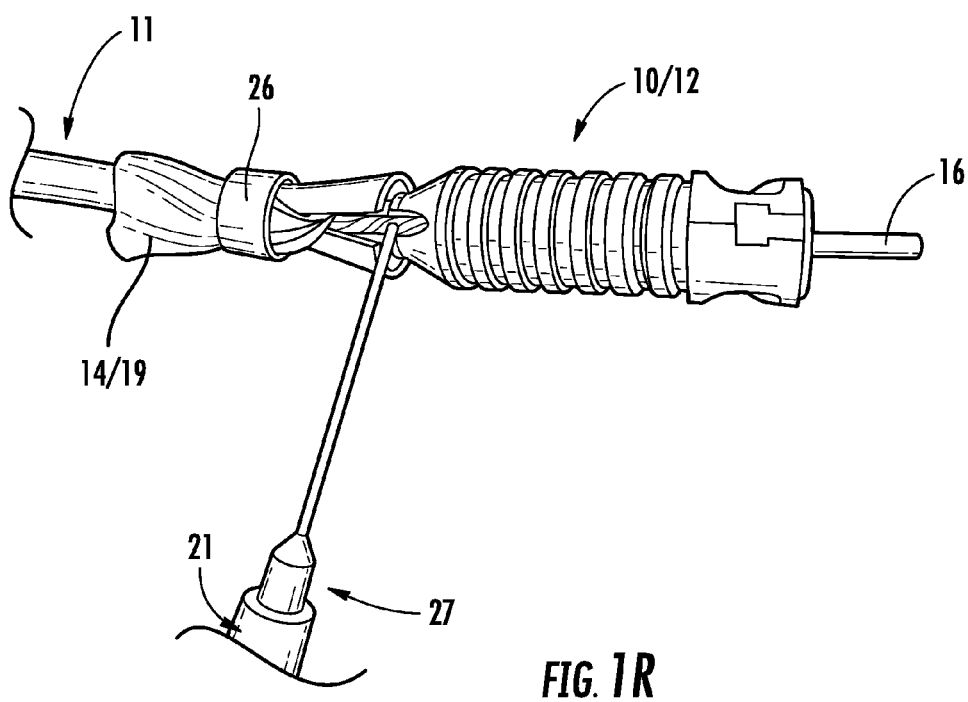

After the yarn pins 20 have been partly inserted into said recesses 17 being filled with said adhesive, preferably with said resin 21, the visible parts 22 of said yarn pins 20 (see FIG. 1*r*) not being inserted into said resin filled recesses 17 are coated with the same adhesive, preferably with the same resin using said pipette 27.

Figure 1S:
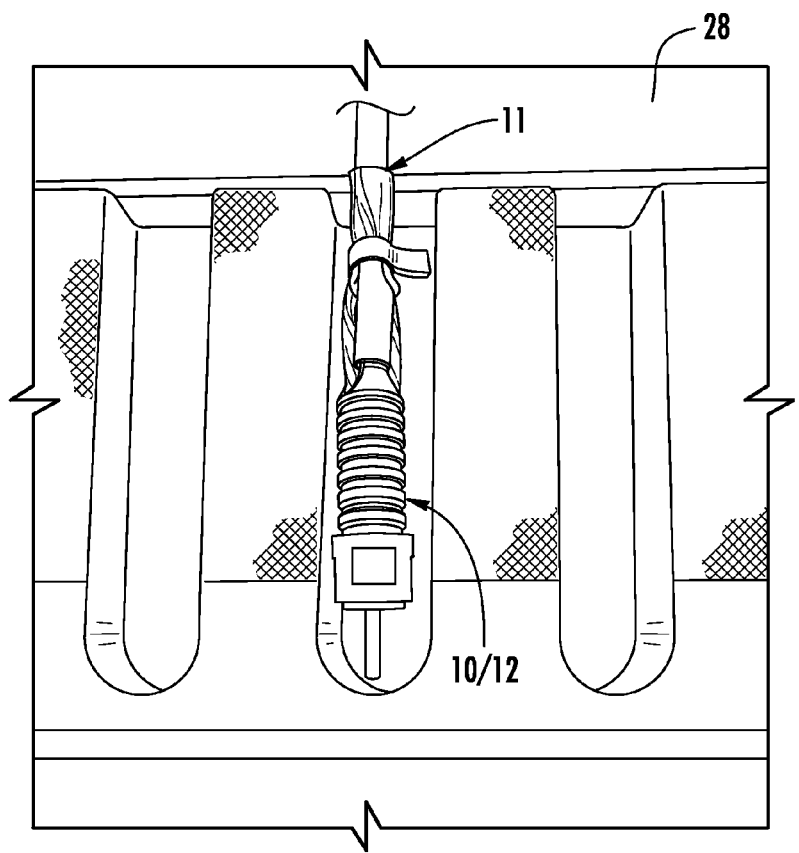

The assembly provided by these method steps is then cured. For instance, the assembly is heated (see FIG. 1*s*) in an oven 28 to cure the adhesive, preferably the resin 21, and to thereby gain rigidity.

Preferably, as adhesive a heat curable epoxy resin is used to fasten said rigid yarn pins 20 to said inner connector part 12, but other suitable adhesive materials are possible.

Figure 1T:
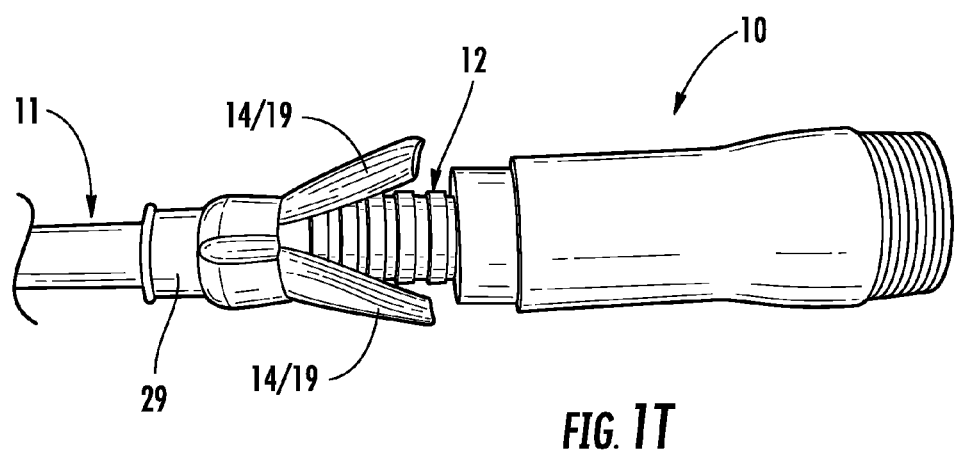

After the yarn pins 20 have been fastened to inner connector part 12, the loose yarn of the second bundles 19 (see FIG. 1*t*) which have not been used to form the or each yarn pin 20 is fastened, especially by a crimp device 29, to said inner part 12 of said fiber optic outdoor connector 10.

The novel method allows to create a secure and simple attachment of a fiber optic cable, especially of a fiber optic outdoor drop cable, having loose glass or aramid yarn as strength members to a fiber optic connector, especially to a rugged or hardened outdoor fiber optic connector. Its superiority over standard crimped solution is that better tensile strength as well as better flexing and twist performance can be provided.

The novel method can be applied to any kind of fiber optic cables like indoor and outdoor cables where the loose yarn can be found. As for the connectors, various kinds of those can be used as long as their construction allows for yarn pins insertion/attachment. The number of yarn pins that are formed can be greater than two, provided the connector can accept more than two yarn pins.

The adhesive 25 which is used to form the yarn pins 20 within the fifth step (see FIGS. 1*k*, 1*l*, 1*m*) of the method is different from the adhesive 21 which is used to attach the yarn pins 20 to the inner part 12 of fiber optic connector 10 within the sixth step (see FIGS. 1*n*, 1*p*, 1*q*, 1*r*) of the method. The adhesive 25 used in the fifth step (see FIGS. 1*k*, 1*l*, 1*m*) of the method is preferably a paper glue which allows to form the yarn pins 20 in a way that they keep their shape but can be bended after forming the same. The adhesive 21 used in the sixth step (see FIGS. 1*n*, 1*p*, 1*q*, 1*r*) of the method is preferably a heat curable epoxy resin which provides rigidity and preferably anti-buckling strength after the curing step.

The novel assembly provided by the method described above comprises a fiber optic connector 10 fastened to a fiber optic cable 11; said fiber optic cable 11 comprising the at least one optical fiber, the loose yarn 14 serving as strength members and the outer cable sheath 15 surrounding said loose yarn and the or each optical fiber; said fiber optic connector 10 comprising the inner part 12 having the at least two recesses 17 into which strength members of a fiber optic cable can be inserted; whereby the yarn pins 20 being formed from the bundles 18 of loose yarn 14 are inserted into the recesses 17 of said inner part 12 of said fiber optic connector 10 and fastened to said inner part 12 using the adhesive.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for the purpose of limitation.

We claim:

1. A method for fastening a fiber optic connector to a fiber optic cable, comprising at least the following steps:
    a) providing a fiber optic cable comprising at least one optical fiber, loose yarn serving as strength members and an outer cable sheath surrounding said loose yarn and the at least one optical fiber;
    b) providing a fiber optic connector comprising an inner part having at least two recesses into which strength members of a fiber optic cable can be inserted;
    c) exposing a portion of said loose yarn of the fiber optic cable at an end of the fiber optic cable;
    d) splitting the exposed portion of said loose yarn into at least two bundles;
    e) forming at least two yarn pins from said bundles by gluing the loose yarn of the respective bundle together; and
    f) inserting each yarn pin into a respective recess of said inner part of said fiber optic connector and fastening said yarn pin to said inner part by using an adhesive.

2. The method of claim 1, wherein the yarn pins are formed from said bundles of loose yarn by twisting and thereafter gluing the loose yarn of the respective bundle together.

3. The method of claim 1, wherein the loose yarn of the respective bundle is glued by coating said loose yarn of the respective bundle with an adhesive over the whole exposed length of the respective loose yarn bundle.

4. The method of claim 1, wherein a paper glue is used as adhesive to form the yarn pins.

5. The method of claim 1, wherein the recesses of said inner part of said fiber optic connector which receive said yarn pins are filled with an adhesive and that then the yarn pins are partly inserted into said recesses being filed with said adhesive.

6. The method of claim 5, wherein after the yarn pins have been partly inserted into said recesses being filed with said adhesive visible parts of said yarn pins being not inserted into said adhesive filled recesses are coated with adhesive.

7. The method of claim 5, wherein the assembly is heated to cure the adhesive and to thereby gain rigidity.

8. The method of claim 1, wherein a heat curable resin is used as adhesive to fasten said yarn pins to said inner connector part.

9. The method of claim 1, wherein the outer cable sheath of fiber optic cable is cut through in a lengthwise direction at two opposite sides of the fiber optic cable.

10. The method of claim 1, wherein the loose yarn is split into at least two first bundles and at least one second bundle, wherein the first bundles are used in step e) to from the yarn pins, and wherein the or each second bundle is not used to form said yarn pins.

11. The method of claim 10, wherein the or each second bundle not being used to form said yarn pins becomes preliminary attached to the outer cable sheath of the fiber optic cable.

12. The method of claim 10, wherein the loose yarn of the or each second bundle which has not been used to form the yarn pins is fastened to said inner part of said fiber optic connector.

13. An assembly comprising a fiber optic connector fastened to a fiber optic cable:
    the fiber optic cable comprising at least one optical fiber, loose yarn serving as strength members and an outer cable sheath surrounding said loose yarn and the at least one optical fiber, wherein the one or more yarn pins are formed from said bundles of loose yarn by gluing the loose yarn of the respective bundle together; and
    the fiber optic connector comprising an inner part having at least two recesses into which strength members of a fiber optic cable can be inserted, wherein one or more yarn pins being formed from bundles of loose yarn are inserted into respective recesses of said inner part of said fiber optic connector and fastened to said inner part using an adhesive.

14. The assembly of claim 13, wherein the fiber optic connector is an outdoor connector.

15. The assembly of claim 13, wherein the fiber optic cable has a generally round cross-section.

16. The assembly of claim 13, wherein the one or more yarn pins are formed from said bundles of loose yarn by twisting and thereafter gluing the loose yarn of the respective bundle together.

17. The assembly of claim 13, wherein the loose yarn of the respective bundle is glued by coating said loose yarn of the respective bundle with an adhesive over the whole exposed length of the respective loose yarn bundle.

18. The assembly of claim 13, wherein the recesses of said inner part of said fiber optic connector which receive said yarn pins are filled with an adhesive and that then the yarn pins are partly inserted into said recesses being filled with said adhesive.

* * * * *